P. L. HULIN.
PROCESS FOR THE EXTRACTION OF CHLORIN.
APPLICATION FILED SEPT. 15, 1916.
1,246,099.
Patented Nov. 13, 1917.
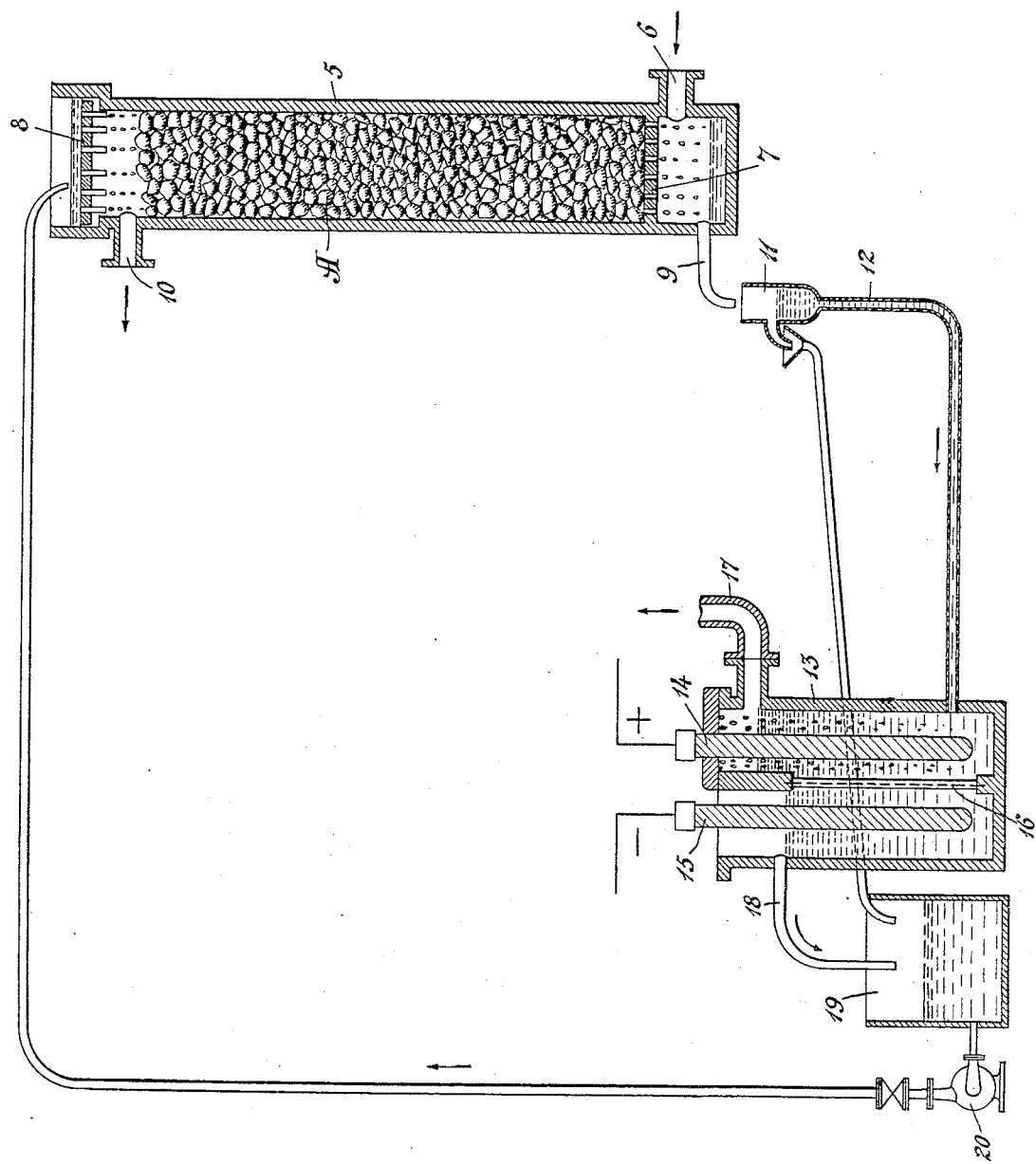
WITNESSES
INVENTOR
PAUL LÉON HULIN
BY
ATTORNEYS

UNITED STATES PATENT OFFICE.

PAUL LÉON HULIN, OF GRENOBLE, FRANCE.

PROCESS FOR THE EXTRACTION OF CHLORIN.

1,246,099.  Specification of Letters Patent.  Patented Nov. 13, 1917.

Application filed September 15, 1916. Serial No. 120,328.

*To all whom it may concern:*

Be it known that I, PAUL LÉON HULIN, of 6 Rue Félix Poulat, Grenoble, (Isère,) Republic of France, engineer, have invented Processes for the Extraction of Chlorin, of which the following is a full, clear, and exact description.

This invention has for its principal object to enable the more or less dilute chlorin contained in certain gaseous industrial mixtures to be extracted in a sufficient state of purity to enable it to be liquefied. Such gaseous mixtures, which contain chlorin either in a too dilute or in a too impure state to enable it to be liquefied by the usual means, are chiefly the gases produced by the Deacon process and those which result from the electrolysis of chlorids in the state of igneous fusion, *e. g.* chlorids of sodium, potassium, calcium, magnesium, etc. The chlorin which these manufactures furnish is diluted with inert gas in variable quantities.

In the Deacon process, as is well known, the amount of chlorin in the gas, which is particularly suitable for the production of chlorid of lime is about 12%, but in the operation of electrolyzing chlorids in fusion there is no constancy of composition of the bath, the chlorin content being susceptible to sudden and sometimes considerable variations due to a number of causes which it is impossible to here set forth.

The Deacon gases contain principally the constitutive elements of the air, together with other constituents such as more or less carbonic acid, and fumes resulting from a partial volatilization of the chlorid submitted to electrolysis. In addition to being unsuitable for liquefaction these gases, especially by reason of the carbonic acid which they contain, do not lend themselves to the preparation of chlorid of lime. Hence a great practical obstacle to the development of the electrolytic process of treating chlorids in igneous fusion is presented which it is the object of the present process to overcome.

Obviously, the present process may be used for the extraction of dilute or impure chlorin present in sources other than those above referred to, and it may also serve for the production of rich chlorin of a high degree of purity suitable for divers applications.

The drawing accompanying this specification and forming part thereof shows an elevation of my invention partly diagrammatic and partly in section. Referring to the drawings, a tower 5 has an inlet 6 at its lower end for the impure gases usually mixed with chlorin, perforated transverse partitions 7 and 8 located at the lower and upper portions thereof respectively and a spigot 9 extending from the lower portion thereof. An outlet 10 is shown at the upper portion of the chamber for the escape of the residual gases separated from the chlorin in the operation of the device. Beneath the spigot 9 a reservoir 11 having an outlet pipe 12 which extends into an electrolyzing cell indicated in its entirety by 13 and having the anode 14 and cathode 15 separated from each other by a membrane 16. The portion of the cell 13 occupied by the anode is suitably covered so that none of the chlorin produced as will be described is lost. From the upper portion of the electrolyzing chamber 13 extends an outlet pipe 17 for the escape of the purified chlorin. This pipe leads to a suitable reservoir for storing the chlorin. An overflow pipe 18 is provided for the cathode compartment of the electrolyzing chamber 13 and has its lower end projecting into a reservoir 19. Connected to this reservoir is a pump 20 which pumps the ferrous chlorid solution from the reservoir 19 to the top of the tower 5. The solution distributes itself over the perforated plate and drips down through the inert material A and perforated plate 8 as will be described.

In the operation of the device the mixed gases containing a large percentage of chlorin and other gases are led into the inlet 6, the lighter gases passing through the perforated partition 7 through the inert material A in the tower and meet the ferrous chlorid which is being introduced at the top of this tower, as will hereinafter more fully appear. The ferrous chlorid descending through the tower 5 meets the chlorin gas and chemically combines therewith producing ferric chlorid ($FeCl_3$). The ferric chlorid thus formed passes through the spigot 9 into the reservoir 11 through the pipe 12 into the electrolyzing chamber 13 and is there electrically decomposed into ferrous chlorid ($FeCl_2$) and chlorin ($Cl_2$), the chlorin passing through the outlet pipe 17. The ferrous chlorid continuously passes off through the overflow pipe 18 into the chamber 19 from which it is pumped to the top of the tower 5 and in descending meets the chlorin introduced through inlet 6 and is again converted into the ferric chlorid ($FeCl_3$). The operation continuously repeats itself with the continuous production of a commercially pure chlorin passing off through the outlet pipe 17.

The essential features of the process are:—

1. Bringing the gases containing dilute or impure chlorin in contact with an aqueous solution of a metallic chlorid of a low chlorin content (e. g. $FeCl_2$) capable of passing to a higher state of chlorination (e. g. $Fe_2Cl_6$) by absorbing the chlorin of the gaseous mixture.

2. Then electrolyzing under a specified voltage the aqueous solution of the metallic chlorid of higher chlorin content (e. g. $Fe_2Cl_6$) after having acidified it, and in causing it to circulate from the anode to the cathode, which has for effect to liberate the chlorin and to regenerate the lower chlorid (e. g. $FeCl_2$) in the same solution. The latter in turn gets richer in chlorin by coming in contact with the chlorin-containing gases, thus insuring the succession of the two phases "absorption" and "electrolysis," which by their combination form the basis of the present process.

To extract, for example, the chlorin contained in the gas from a plant for decomposing a fused chlorid:—the gas is first passed through a suitable tower and is there submitted, by means of a stream of water, to a preliminary washing operation for the purpose of freeing it from the fumes composed mainly of the chlorid submitted to electrolysis. After this operation, which may be more or less complete and different according to the circumstances of each particular case, the absorption of the chlorin is brought about by passing the gases from below upward through a sufficiently high absorption tower made of earthenware (or through several such towers in succession) through which is passed in the reverse direction and in contact with the gas a solution of ferrous chlorid ($FeCl_2$). The earthenware absorption towers which may be employed for this purpose may be arranged in the same manner as those which serve for the condensation of hydrochloric acid in the industrial manufacture of said acid. The solution employed in these towers to absorb the chlorin may be of very variable degree of concentration; it may for example contain initially about 30% of iron protochlorid. It is of course advantageous, in order to obtain satisfactory working of the process, to carry as far as possible the conversion of the protochlorid into perchlorid during the operation of absorbing the chlorin. The solution of iron perchlorid obtained is submitted to electrolysis under the following conditions which have for effect to produce, on the one hand, chlorin, and on the other hand, not metallic iron, but iron protochlorid ($FeCl_2$). To this end each unit of the electrolyzing apparatus, the materials of which should be, for example, earthenware or other substances not liable to attack, is constituted by a compartment containing the anode and a compartment containing the cathode, these two compartments and the two electrodes (or groups of electrodes), which they contain, being separated by a very porous partition such as a sheet of asbestos. The electrodes are made preferably of graphite containing carbon. The anode compartment is closed by a cover.

Each electrolyzing unit is provided with an inlet for leading the liquid into the anode compartment and an overflow pipe leading said liquid to the cathode compartment; a tube carried by the cover of the anode compartment serving to convey the chlorin to a holder or collector. The solution of iron perchlorid coming from the absorption towers should be acidified by the addition of hydrochloric acid in moderate and variable proportions, say, for example, about 5 parts of HCl (by weight) to 100 parts (also by weight) of $Fe_2Cl_6$.

The two compartments of the apparatus having been first filled with this solution, a current having an E. M. F. of about 2.5 volts (two volts and a half) per unit is passed through concurrently with the introduction of the acidified solution of iron perchlorid into the anode compartment. The electric current thus applied liberates chlorin at the anode while there is at the cathode a tendency to the appearance of an Fe ion; but owing to the presence in the solution of sufficient quantities of HCl and of $Fe_2Cl_6$, this Fe ion cannot exist and at the same time hydrogen cannot become liberated, and it is finally $FeCl_2$ which appears at the cathode and which remains dissolved together with the excess $Fe_2Cl_6$.

This characteristic feature of the process is kept constant by the active circulation of the acidified solution of iron perchlorid coming from the absorption towers, the circulation taking place from the anode compartment to the cathode compartment through the dividing wall which should be very permeable to permit of the free passage to the liquid, the liquid in excess running away through the overflow of the cathode compartment whence it passes back to the chlorin-absorption towers to regenerate, by dissolving the iron perchlorid which has been reduced to iron protochlorid by the electrolytic action.

It is necessary to so regulate the flow of the solution of the iron chlorids relatively to the rate of electrolytic decomposition that there shall always be such an excess of perchlorid in contact with the cathode as will obviate the deposition of iron or the liberation of hydrogen. On the other hand a too rapid circulation, leaving an excessive amount of perchlorid in the outgoing solution, is to be avoided as it would have the disadvantage of rendering the absorption of chlorin less active in the towers, and would necesssitate building the towers of excessive dimensions.

The most favorable regime which, bearing in mind the conditions which should be observed in carrying out the process may have to be varied within wide limits, and it is impossible to set out a precise formula which will be universally applicable. The best course to adopt in putting the process into operation will therefore be to first determine, experimentally, the relation which, having in view the actual installation and conditions of working, is most suitable in any particular case between the outflow of the chlorid solution and the liberation of chlorin corresponding with the electric current. As a guide it may be taken that the flow should be so regulated that a third of the iron perchlorid contained in the saturated solution when it comes from the absorption tower is decomposed. Too high voltage and excessive acidification with hydrochloric acid might lead to the liberation of hydrogen at the cathode.

The chlorin produced may be collected and stored by the means with which apparatus for the production of chlorin are usually provided.

The losses in the solutions, such as the necessary acidity, should be made good by corresponding additions. If the solutions become too impure they should be purified or replaced by fresh solutions.

It is obviously possible to treat by the present process chlorids other than those of iron, for example copper chlorids ($CU_2Cl_2$ and $CuCl_2$) or solutions containing mixtures of chlorids which lend themselves to treatment by this process, which mixtures may be varied to suit particular requirements.

Claims.

1. A process of extracting chlorin which consists in absorbing the chlorin contained in gaseous mixtures by means of a solution of a lower chlorid which thus passes to the state of a higher chlorid and then electrolyzing the aqueous solution of this higher chlorid.

2. A process of extracting chlorin consisting in absorbing the chlorin contained in a gaseous mixture by means of a lower chlorid which thus passes into the state of a higher chlorid, then electrolyzing under a specified voltage the aqueous solution of this higher chlorid after having acidulated said solution by the addition of hydrochloric acid and causing the electrolyte to circulate from the anode to the cathode which has for result to liberate at the anode industrially pure chlorin and to regenerate in the cathodic solution a lower chlorid capable of fixing a further quantity of chlorin and insuring the continuity of the operation.

3. A process of extracting chlorin which comprises absorbing the chlorin contained in gaseous mixtures by a solution of ferrous chlorid which passes to the state of a ferric chlorid and then electrolyzing the solution of ferric chlorid thus formed.

4. A process of extracting chlorin which comprises absorbing the chlorin contained in a gaseous mixture by a solution of ferrous chlorid which passes to the state of ferric chlorid and then electrolyzing under a specified voltage the aqueous solution of this ferric chlorid, after having acidulated said solution by the addition of hydrochloric acid, and causing the electrolyte to circulate from the anode to the cathode which results in liberating at the anode of industrially pure chlorin and to regenerate in the cathode solution ferrous chlorid capable of fixing a further quantity of chlorin and insuring the continuity of the operation.

The foregoing specification of my process for the extraction of chlorin signed by me this twenty-ninth day of August 1916.

PAUL LÉON HULIN.

Witnesses:
THOMAS D. DAVIS,
BAYMAY.